No. 820,122. PATENTED MAY 8, 1906.
G. MORRICE & C. G. GRIM.
POWER TRANSMISSION.
APPLICATION FILED FEB. 10, 1905.

Witnesses,
Chas. E. Chapin.

Inventors,
George Morrice
Charles G. Grim
By Geo. H. Strong Atty

UNITED STATES PATENT OFFICE.

GEORGE MORRICE AND CHARLES G. GRIM, OF SONORA, CALIFORNIA.

POWER TRANSMISSION.

No. 820,122.  Specification of Letters Patent.  Patented May 8, 1906.

Application filed February 10, 1905. Serial No. 245,155.

*To all whom it may concern:*

Be it known that we, GEORGE MORRICE and CHARLES G. GRIM, citizens of the United States, residing at Sonora, in the county of Tuolumne and State of California, have invented new and useful Improvements in Power Transmission, of which the following is a specification.

Our invention relates to an improved power-transmission mechanism, and especially to a friction-gear. Its object is to provide a friction-clutch mechanism for use in conjunction with mining-hoists and especially with hoists run by a gasolene-engine, and to provide a clutch mechanism that can be applied direct to the engine-shaft, doing away with all belting and like connections, and which mechanism will be simple, safe, and practical, rendering it possible to lower a skip or cage safely even when the engine-shaft is running full speed in an opposite direction.

The invention consists of the parts and the construction and combination of parts as hereinafter more fully described and claimed, having reference to the accompanying drawings, in which—

Figure 1:
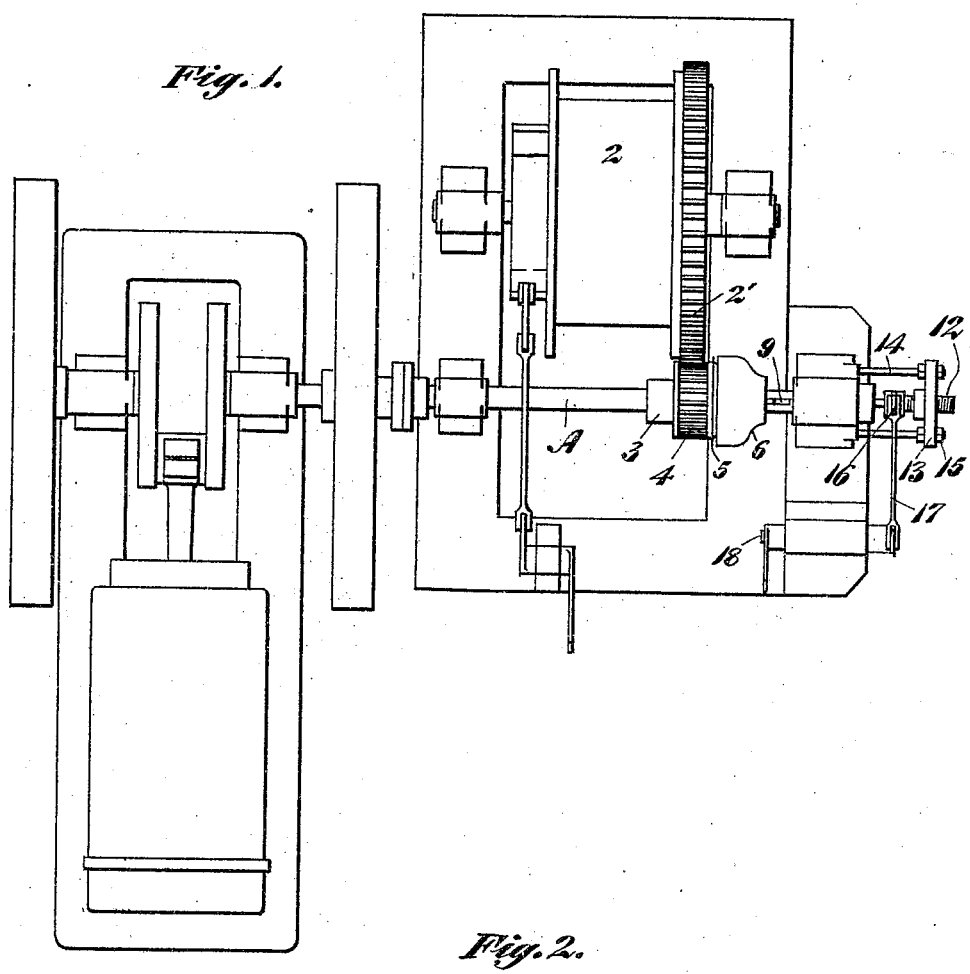
Figure 2:
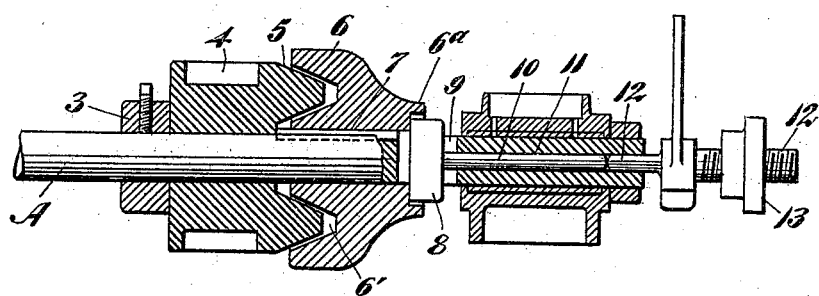

Figure 1 is a plan view of engine and hoist, showing application of our invention. Fig. 2 is a sectional view of clutch mechanism.

A represents an engine-shaft or other power-shaft run constantly or otherwise, and 2 illustrates a hoisting-drum to which power to rotate it is to be applied intermittently. Turning loose on shaft A and held against longitudinal movement thereon by a collar 3 is an idle pinion 4, provided on the end opposite collar 3 with a half-friction 5. Pinion 4 is in constant mesh with a gear 2' on drum 2. 6 is a corresponding female friction member sliding on a feather 7 on and turnable with the shaft and adapted when moved up into tight frictional contact with member 5 to revolve the latter and pinion 4 and drum in unison, the speed of the pinion and drum depending on the load and on the closeness of the frictional contact of the members. It is to be observed that the frictional surfaces of members 5 6 are double—that is, the friction area of member 6 is in the form of an annular groove 6' and the part 5 in the form of an annulus fitting the groove of member 6. The member 6 is movable into engagement with member 5 by means of a cross-piece 8, operating in a transverse slot 9 in the shaft, a rod 10 in a central passage-may 11 in the end of the shaft engaging with the cross-piece 8 and a screw 12 bearing against the rod 10. The cross-piece 8 is kept in position by the flange 6ª on member 6. The rod 10 is for the purpose of preventing crystallization of the other metal parts. The outer end of the screw is threaded and turns in a threaded support 13, carried on rods 14, from the adjacent end journal-box of the shaft and adjustable by means of the set-nuts 15. The rotation of the screw in either direction is sufficient to move the clutch member 6 into and out of engagement with member 5 and is done by suitable means, as the arm 16, locked to the screw, and the link 17, connecting arm 16 and another arm on the lever-shaft 18.

Among the advantages of this construction may be mentioned the following: The friction being made double-faced and conical and the concavity of member 6 prolonged, a large extent of friction-surface is afforded and provision is made for take up of any wear. Great power is obtained for a minimum amount of weight. A saving in power is effected by reason of the direct connection with the drive-shaft. The device is absolutely safe even when applied to a gasolene-engine which is recognized as most unreliable for hoisting on account of the liability to miss sparking. Power can be run at full speed, and the skip or cage can be raised or lowered just as slow or as fast as desired and without a brake. The friction being double makes the clutch very sensitive and at the same time so powerful that in the event of the power running away from any cause whatever, as in use with a hoist, the skip can be lowered to any depth with safety, though the power may be running full speed in the opposite direction. The construction is such that it can readily and quickly be applied to any shaft.

It is possible that various modifications in our invention may be made without departing from the principle thereof, and we do not wish to be understood as limiting ourselves to the specific construction as herein shown and described.

Having thus described our invention, what we claim, and desire to secure by Letters Patent, is—

The combination of an engine-shaft, a gear loose on said shaft and having a member of a clutch, a female clutch member slidable on the shaft and adapted to engage the clutch member of the loose gear said shaft having a central passage-way, a rod slidably mounted in said passage-way of the shaft, and provided with a cross-piece, a screw in line with the rod and made separate therefrom and bearing endwise thereon, and means for adjusting the screw, said slidable clutch member having an integral flange for housing the ends of the cross-piece.

In testimony whereof we have hereunto set our hands in presence of two subscribing witnesses.

GEORGE MORRICE.
CHARLES G. GRIM.

Witnesses:
  PERCY HODGES,
  JAS. L. ROOT.